Oct. 26, 1943. E. F. BRUNNER 2,332,621

VALVE

Filed Dec. 18, 1940

Inventor
Elmer F. Brunner

By
Attorney

Patented Oct. 26, 1943

2,332,621

UNITED STATES PATENT OFFICE 2,332,621

VALVE

Elmer F. Brunner, Silver Lake, Ohio, assignor to Wingfoot Corporation, Akron, Ohio, a corporation of Delaware Application December 18, 1940, Serial No. 370,649

4 Claims. (Cl. 152—415)

This invention relates to a valve for the rim of a wheel on which an open-beaded tire is mounted. The valve comprises a passage for the introduction of water into the cavity between the tire and rim and another passage for venting the air from this cavity as it is filled with water. Independent means is provided for separately closing each of these passages. In the preferred form of the invention the inner end of the air passage is equipped with means for union with a small rubber tube and the other end of the air passage is connected with the atmosphere between the rim through which the valve passes and the means for closing the water passage.

Recently there has been considerable interest in filling open-beaded tubeless tires with water, more particularly for use on tractors and implements. Various means have been suggested for filling such tires with water. The valve of this invention is designed for use in filling such a tire with water and simultaneously removing the air from the tire. To completely remove the air from the tire it is necessary to connect the air vent of the valve with the top of the cavity within the tire. This is advantageously done by slipping a rubber tube over the inner end of the air passage and equipping the other end of the rubber tube with a cork or other float or fastening it to the inner wall of the tire. In this way as the tire is filled with water under pressure the air is withdrawn through the rubber tube and passes out through the air passage of the valve. When the tire is completely filled with water, of course, the rubber tube and air vent will become filled with water, and the discharge of water through the air vent will serve as a signal that all air has been removed from the tire. The air vent and water vent will then be closed. If desired the air vent may first be closed and the introduction of water continued until the desired hydrostatic pressure is built up within the tire. The water passage will then be closed.

Figure 1:
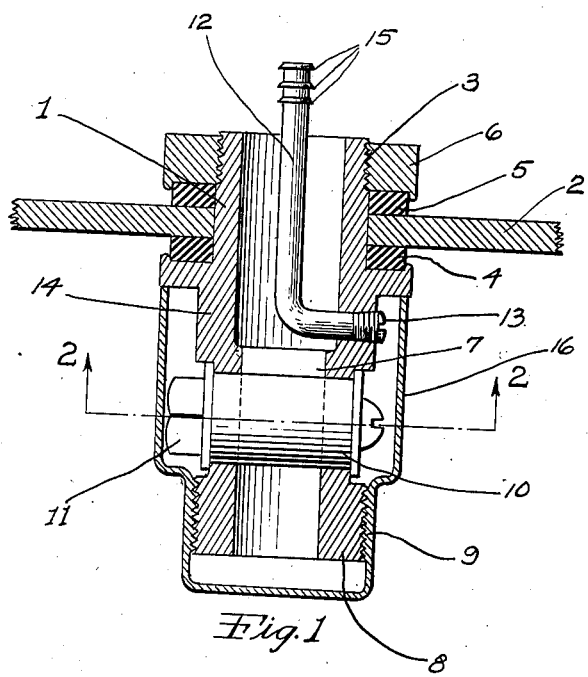
Figure 2:
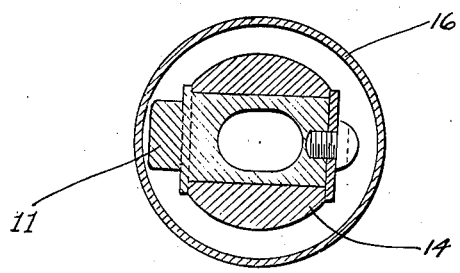

The invention will be further described in connection with the accompanying drawing in which Fig. 1 is a section in part through the valve, and Fig. 2 is a section through the plug valve on the line 2—2 of Fig. 1.

The base of the valve 1 is designed for insertion through a hole in the rim 2 of the wheel of a vehicle. The base is threaded externally as indicated at 3. The washers 4 and 5 are provided to prevent the leakage of water through the hole in the rim. The nut 6 is threaded onto the base and tightened to hold the valve in place on the rim.

Water is introduced into the tire through the water passage 7 by screwing a water connection onto the water inlet 8 which is externally threaded as shown at 9. The water passage is provided with a valve 10 which may be of any suitable design. A plug valve is shown in the drawing. It is turned by means of the hexagonal head 11.

The air passage 12 is provided with suitable closing means. This may be the threaded plug 13. Any suitable valve means may be employed. It is noted that the air passage is vented through the wall 14 of the water passage between the valve 10 and the rim 2. The inner end of the air passage is provided with a burr 15. When one end of a rubber tube is slipped over the inner end of this air passage the burr 15 tends to hold it in place. The other end of this rubber tube takes the air from the tire as it is being filled with water and it escapes through the air passage 12.

To operate the valve the plug valve 10 is opened and the plug of the air valve 13 is removed. A hose, one end of which is connected with a water main, is screwed onto the water inlet 8. The water is turned on, and as the tire is filled the replaced air is removed through the air vent 12. When the tire is completely filled with water, water instead of air will be vented through the outlet 12. The cap 13 is then placed securely on the outlet of the air passage 12, and the introduction of water is discontinued, or the introduction of water may be continued until any desired hydrostatic pressure is built up within the tire. When the desired pressure is obtained the plug valve 10 is closed. The water supply is then disconnected, and the cap 16 is screwed onto the threads 9.

What I claim is:

1. A valve assembly adapted to be secured to a pneumatic tire rim and comprising a hollow cylindrical body, an integral circular flange extending outwardly at right angles to the body near one end thereof, the end of the body adjacent the flange being screw threaded, a collar threaded on the first-named body end, a pair of rubber washers between the flange and the collar, a rotatable closure plug extending transversely of the body between the flange and the second end of the body, a tube extending axially out of the first-named body end and secured in an opening in the side wall of the body between the flange and the plug, a threaded closure for the opening in the side wall of the body, the second end of the body being screw threaded, and a cap threaded onto the second end of the body and extending down into engagement with the flange and surrounding the plug and closure.

2. A valve assembly comprising a hollow cylindrical body, a circular flange extending outwardly at right angles to the body near one end thereof, the end of the body adjacent the flange being screw threaded, a collar threaded on the first-named body end, a rotatable closure plug extending transversely of the body between the flange and the second end of the body, a tube extending axially out of the first-named body end and secured in an opening in the side wall of the body between the flange and the plug, a threaded closure for the opening in the side wall of the body, the second end of the body being screw threaded, and a cap threaded onto the second end of the body and extending down into engagement with the flange and surrounding the plug and closure.

3. A valve assembly comprising a hollow cylindrical body, a circular flange extending outwardly at right angles to the body near one end thereof, the end of the body adjacent the flange being screw threaded, a collar threaded on the first-named body end, a rotatable closure plug extending transversely of the body between the flange and the second end of the body, a tube extending axially out of the first-named body end and secured in an opening in the side wall of the body between the flange and the plug, a closure for the end of the tube extending through the opening in the side wall of the body, the second end of the body being screw threaded, and a cap threaded onto the second end of the body and extending down into engagement with the flange and surrounding the plug and closure.

4. A valve assembly comprising a hollow cylindrical body, a circular flange extending outwardly at right angles to the body near one end thereof, the end of the body adjacent the flange being screw threaded, a collar threaded on the first-named body end, a rotatable closure plug extending transversely of the body between the flange and the second end of the body, a tube extending axially out of the first-named body end and secured in an opening in the side wall of the body between the flange and the plug, a closure for the end of the tube extending through the opening in the side wall of the body, the second end of the body being screw threaded, and a cap threaded onto the second end of the body and extending down and surrounding the plug and closure.

ELMER F. BRUNNER.